(12) United States Patent
Miya et al.

(10) Patent No.: US 9,682,613 B2
(45) Date of Patent: Jun. 20, 2017

(54) VEHICLE INCLUDING ENGINE MOUNT UNITS

(71) Applicant: TOYOTA JIDOSHA KABUSHIKI KAISHA, Toyota-shi (JP)

(72) Inventors: Hiroshi Miya, Nagakute (JP); Nobuya Yoshida, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/031,655

(22) PCT Filed: Oct. 14, 2014

(86) PCT No.: PCT/JP2014/077337
§ 371 (c)(1),
(2) Date: Apr. 22, 2016

(87) PCT Pub. No.: WO2015/060162
PCT Pub. Date: Apr. 30, 2015

(65) Prior Publication Data
US 2016/0263982 A1    Sep. 15, 2016

(30) Foreign Application Priority Data

Oct. 24, 2013  (JP) ................ 2013-220868

(51) Int. Cl.
*B60K 5/00* (2006.01)
*B60K 5/12* (2006.01)

(52) U.S. Cl.
CPC .......... *B60K 5/1283* (2013.01); *B60K 5/1216* (2013.01); *B60K 5/1225* (2013.01)

(58) Field of Classification Search
CPC ...... B60K 5/12; B60K 5/1208; B60K 5/1216; B60K 5/1283

(Continued)

(56) References Cited

U.S. PATENT DOCUMENTS 3,825,090 A * 7/1974 Runkle ............... B60K 5/1216
                                                  180/292
4,076,195 A * 2/1978 Uhler .................... F16F 1/3732
                                                  248/274.1
(Continued)

FOREIGN PATENT DOCUMENTS

CA    1 202 289 A    3/1986
JP    59-083850 A    5/1984
(Continued)

OTHER PUBLICATIONS

International Search Report issued on Jan. 13, 2015 for PCT/JP2014/077337 filed on Oct. 14, 2014.

*Primary Examiner* — Hau Phan
*Assistant Examiner* — Jacob Meyer
(74) *Attorney, Agent, or Firm* — Oblon, McClelland, Maier & Neustadt, L.L.P.

(57) ABSTRACT

A first engine mount unit sharing no distributed load of a power unit includes: a power unit side bracket attached to the power unit; a vehicle body side bracket attached to a vehicle body; and a mount rubber provided between the power unit side bracket and the vehicle body side bracket. At attachment portions of the power unit side bracket and the vehicle body side bracket of the first engine mount unit, a bolt hole is provided in an inner cylinder part adhered to the mount rubber pressed into the power unit side bracket, to adjust variations in the height direction (H direction) of the vehicle, while bolt holes are provided in the vehicle body side bracket to adjust variations in the width direction (W direction) of the vehicle.

7 Claims, 5 Drawing Sheets

(58) Field of Classification Search
USPC .................................................. 180/298, 300
See application file for complete search history.

(56) References Cited

U.S. PATENT DOCUMENTS

| | | | | |
|---|---|---|---|---|
| 4,089,385 A * | 5/1978 | Payoux | ................ | B60K 5/1283 180/232 |
| 4,564,082 A * | 1/1986 | Takehara | ................ | B60K 5/04 180/291 |
| 4,779,834 A * | 10/1988 | Bittner | ................ | B60K 5/1241 180/300 |
| 4,893,779 A * | 1/1990 | Bergelt | ................ | B60K 5/1283 180/292 |
| 5,035,397 A * | 7/1991 | Yamada | ................ | B60K 5/1216 180/297 |
| 5,129,479 A * | 7/1992 | Fujii | .................... | B60K 5/1216 180/297 |
| 5,332,061 A * | 7/1994 | Majeed | ................ | B60K 5/1283 180/312 |
| 5,375,821 A * | 12/1994 | Toshimitsu | .......... | B60K 5/1216 180/312 |
| 5,477,938 A * | 12/1995 | Tsuji | ..................... | B60G 99/00 180/274 |
| 5,740,876 A * | 4/1998 | Shimose | ................ | B60K 5/1216 180/232 |
| 5,845,734 A * | 12/1998 | Samardzich | ......... | B60K 5/1216 180/299 |
| 5,967,251 A * | 10/1999 | Turl | ..................... | B60K 5/1241 180/297 |
| 5,992,816 A * | 11/1999 | Yoshida | ............... | B60K 5/1283 248/542 |
| 6,155,372 A * | 12/2000 | Hirasaka | ............ | B60K 5/1216 180/297 |
| 6,374,939 B1 * | 4/2002 | Hohnstadt | ............. | F16F 15/08 180/299 |
| 6,568,363 B2 * | 5/2003 | Koyama | .................. | F01L 1/02 123/195 A |
| 6,708,793 B2 * | 3/2004 | Witherspoon | ....... | B60K 5/1216 180/291 |
| 6,761,242 B2 * | 7/2004 | Yoshida | ................... | B60K 5/12 180/232 |
| 6,823,960 B2 * | 11/2004 | Shimizu | .................. | B60K 5/12 180/228 |
| 7,032,701 B2 * | 4/2006 | Yoshida | ............... | B60K 5/1216 180/291 |
| 7,185,723 B2 * | 3/2007 | Aoyama | ............... | B60K 5/1208 180/300 |
| 7,328,767 B2 * | 2/2008 | Mori | .................... | B60K 5/1216 180/172 |
| 7,393,016 B2 * | 7/2008 | Mitsui | .................... | B62D 25/08 180/232 |
| 7,413,050 B2 * | 8/2008 | Miyagawa | ........... | B60K 5/1216 180/274 |
| 7,562,737 B2 * | 7/2009 | Miyahara | ............. | B60K 5/1208 180/291 |
| 7,575,087 B2 * | 8/2009 | Kim | ..................... | B60K 5/1216 180/291 |
| 8,042,793 B2 * | 10/2011 | Igami | ................... | B60K 5/1216 180/297 |
| 8,517,453 B2 * | 8/2013 | Yoshida | ............... | B62D 21/152 280/274 |
| 8,794,605 B2 * | 8/2014 | Mizobe | ................. | F16F 1/3828 180/296 |
| 8,839,899 B2 * | 9/2014 | Kim | ..................... | B60K 5/1216 180/291 |
| 8,851,223 B2 * | 10/2014 | Yamashita | ............... | B60K 1/00 180/291 |
| 8,985,260 B2 * | 3/2015 | Holoweiko | ............ | B60K 13/04 180/296 |
| 9,175,739 B2 * | 11/2015 | Ohnishi | .................... | F16F 1/36 |
| 9,205,733 B2 * | 12/2015 | Olsen | .................... | B60K 5/1208 |
| 9,212,716 B2 * | 12/2015 | Yoon | ........................ | F16F 6/005 |
| 2005/0254888 A1 * | 11/2005 | Oji | ......................... | F16F 1/3849 403/187 |
| 2006/0144631 A1 * | 7/2006 | Kim | ..................... | B60K 5/1216 180/299 |
| 2007/0199742 A1 * | 8/2007 | Miyahara | ................. | B60K 5/04 180/58 |
| 2013/0068552 A1 * | 3/2013 | Kim | ..................... | B60K 5/1216 180/300 |
| 2013/0328254 A1 * | 12/2013 | Kojima | ................ | B60K 5/1241 267/140.15 |
| 2016/0039464 A1 * | 2/2016 | Hirano | ................... | B62D 21/11 180/312 |

FOREIGN PATENT DOCUMENTS

| | | |
|---|---|---|
| JP | 62-220736 A | 9/1987 |
| JP | 11-020482 A | 1/1999 |
| JP | 2006-176109 A | 7/2006 |
| JP | 2013-067368 A | 4/2013 |

* cited by examiner

VEHICLE INCLUDING ENGINE MOUNT UNITS

TECHNICAL FIELD

The present invention relates to a vehicle including a plurality of engine mount units. In particular, the present invention relates to a vehicle including a plurality of engine mount units via which a power unit is mounted on a vehicle body.

BACKGROUND ART

Conventionally, a vehicle is known in which a power unit, which is made up of an engine, a transmission and the like, is mounted on a vehicle body via a plurality engine mount units (see, for example, Patent Document 1).

The engine mount unit disclosed in Patent Document 1 includes a vehicle body side bracket that is fixed to a vehicle body (frame) and a power unit side bracket that is fixed to a power unit.

The vehicle body side bracket and the power unit side bracket have respectively bolt holes into which a bolt is inserted to fix both brackets. Also, the bolt holes of the power unit side bracket are formed in the shape of a long hole.

Generally, the vehicle body (frame) in formed by welding steel metal parts, which results in production variations being relatively large. Since the power unit is mounted on the vehicle body via the engine mount units, when the vehicle does not have any mechanism to adjust (absorb) such production variations of the vehicle body, the production variations of the vehicle body and assembly variations of the engine mount units may prevent the power unit from maintaining a predetermined position.

For this reason, conventionally, the bolt holes of the power unit side bracket are formed in the shape of a long hole so that the positions of the power unit and the vehicle body can be adjusted (i.e., the variation can be absorbed) in a long-side direction of the bolt holes.

PRIOR ART DOCUMENT

Patent Document

[Patent Document 1] JP H11-020482 A

SUMMARY OF INVENTION

Problem to be Solved by Invention

In the configuration disclosed in Patent Document 1, it is possible to adjust (absorb) the production variations of the vehicle body in one direction along the long-side direction of the elongated shaped bolt holes formed in the power unit side bracket. On the other hand, there is a problem that adjusting variations in a plurality of directions of the vehicle (for example, the width direction and the height direction of the vehicle) is difficult.

The present invention was made in consideration of the above circumstances. An object of the present invention is to provide a vehicle including a plurality of engine mount units via which a power unit is mounted on a vehicle body, the plurality of engine mount units capable of adjusting variations in a plurality of directions of the vehicle.

Means for Solving Problem

In order to resolve the above problems, a vehicle including engine mount units according to the present invention is configured as described below.

That is, the present invention is predicated on a vehicle including a plurality of engine mount units via which a power unit is mounted on a vehicle body. In the vehicle including the plurality of engine mount units of the present invention, a load of the power unit is not distributed to one engine mount unit among the plurality of engine mount units, while the load of the power unit is distributed to the other engine mount units among the plurality of engine mount units. The engine mount unit to which the load of the power unit is not distributed includes: a power unit side bracket to be attached to the power unit; a vehicle body side bracket to be attached to the vehicle body; and an insulator disposed between the power unit side bracket and the vehicle body side bracket. At attachment portions of the power unit side bracket and the vehicle body side bracket of the engine mount unit to which the load of the power unit is not distributed, a first variation adjustment mechanism to adjust variations in a first direction is provided in either the power unit side bracket or the vehicle body side bracket, while a second variation adjustment mechanism to adjust variations in a second direction intersecting with the first direction is provided in the insulator. The first direction is the width direction of the vehicle, and the second direction is the height direction of the vehicle. The first variation adjustment mechanism provided in either the power unit side bracket or the vehicle body side bracket is configured to adjust variations in a width direction of the vehicle. The second variation adjustment mechanism provided in the insulator is configured to adjust variations in a height direction of the vehicle. The engine mount unit to which the load of the power unit is not distributed is disposed on an upper side in a gravitational direction of the power unit.

With the vehicle including the engine mount units configured as described above, for example, when the power unit is mounted on the vehicle body via the engine mount units to which the load is distributed, and further when the power unit is mounted on the vehicle body via the engine mount unit to which the load is not distributed, variations (production variations and the like) in the mounting position of the power unit on the vehicle body can be adjusted in the first direction and the second direction (e.g., the width direction and the height direction of the vehicle) by the first variation adjustment mechanism and the second variation adjustment mechanism. That is, in the engine mount unit to which the load of the power unit is not distributed, the relative positions of the power unit side bracket and the vehicle body side bracket are adjusted in the first direction and the second direction, thus the variations (production variations and the like) in the plurality of directions of the vehicle can be adjusted (absorbed). More specifically, it is possible to adjust the relative positions of the power unit side bracket and the vehicle body side bracket in the width direction and the height direction of the vehicle. Thus, it is possible to absorb, by the first variation adjustment mechanism and the second variation adjustment mechanism, the variations in the mounting position of the power unit on the vehicle body in the width direction and the height direction of the vehicle.

Also, in the engine mount units to which the load of the power unit is mainly distributed, there is a problem that, when the power unit is mounted on the vehicle body, it is not possible to perform position adjustment in the plurality of directions of the vehicle due to a large load being applied to the engine mount units. On the other hand, in the present invention, by performing position adjustment in the plurality of directions in the engine mount unit to which no load of the power unit is distributed, it is possible to perform position adjustment of the power unit and the vehicle body with high accuracy.

The specific configurations of the present invention will be described below.

In the vehicle including the engine mount units of the present invention, preferably, the first direction is one of a height direction, a width direction and a longitudinal direction of the vehicle, and the second direction is one of the height direction, the width direction and the longitudinal direction of the vehicle and intersects with the first direction. It is preferable that the first variation adjustment mechanism provided in either the power unit side bracket or the vehicle body side bracket is configured to adjust variations in one direction among the height direction, the width direction and the longitudinal direction of the vehicle, and that the second variation adjustment mechanism provided in the insulator is configured to adjust variations in one direction among the height direction, the width direction and the longitudinal direction of the vehicle, the direction intersecting with the first direction. With the above configuration, it is possible to adjust the relative positions of the power unit side bracket and the vehicle body side bracket in two direction intersecting with each other out of the height direction, the width direction and the longitudinal direction of the vehicle. In this way, it is possible to absorb, by the first variation adjustment mechanism and the second variation adjustment mechanism, the variations in be mounting position of the power unit on the vehicle body in the two direction intersecting with each other out of the height direction, the width direction and the longitudinal direction of the vehicle.

In this case, preferably, the first direction is the height direction of the vehicle, and the second direction is the width direction of the vehicle. Also, it is preferable that the first variation adjustment mechanism provided in either the power unit side bracket or the vehicle body side bracket is configured to adjust variations in the width direction of the vehicle, and that the second variation adjustment mechanism provided in the insulator is configured to adjust variations in the height direction of the vehicle. With the above configuration, it is possible to adjust the relative positions of the power unit side bracket and the vehicle body side bracket in the width direction and the height direction of the vehicle. Thus, it is possible to absorb, by the first variation adjustment mechanism and the second variation adjustment mechanism, the variations in the mounting position of the power unit on the vehicle body in the width direction and the height direction of the vehicle.

Also, in the vehicle including the engine mount units of the present invention, it is preferable that the first variation adjustment mechanism provided in either the power unit side bracket or the vehicle body side bracket is a first long hole elongated in the first direction, and that the second variation adjustment mechanism provided in the insulator is a second long hole elongated in the second direction intersecting with the first direction. With the above configuration, it is possible to adjust the relative positions of the power unit side bracket and the vehicle body side bracket in the first direction (long side direction) of the first long hole and the second direction (long side direction) of the second long hole. Thus, it is possible to absorb, by the first long hole and the second long hole, the variations in the mounting position of the power unit on the vehicle body.

The vehicle including the engine mount units of the present invention preferably further includes a fastening member to fix the power unit side bracket, the vehicle body side bracket and the insulator. Also, it is preferable that the relative positions of the power unit side bracket and the vehicle body side bracket are adjustable in a state in which the fastening member is being inserted through: the first variation adjustment mechanism provided in either the power unit side bracket or the vehicle body side bracket; and the second variation adjustment mechanism provided in the insulator. With the above configuration, it is possible to adjust the relative positions of the power unit side bracket and the vehicle body side bracket in the first direction and the second direction relative to the fastening member. Thus, it is possible to absorb easily, by the first variation adjustment mechanism and the second variation adjustment mechanism using the fastening member, the variations in the mounting position of the power unit on the vehicle body.

In the vehicle including the engine mount units of the present invention, it is preferable that the first variation adjustment mechanism is provided in the vehicle body side bracket, and that the insulator including the second variation adjustment mechanism is provided in the power unit side bracket. With the above configuration, the variations (production variations and the like) in the mounting position of the power unit on the vehicle body can be adjusted by adjusting the relative positions of the power unit side bracket (insulator) and the vehicle body side bracket in the first direction and the second direction (e.g., the width direction and the height direction of the vehicle) by the first variation adjustment mechanism provided in the vehicle body side bracket and the second variation adjustment mechanism provided in the insulator in the power unit side bracket. Thus, in the engine mount unit to which no load of the power unit is distributed, the relative positions of the power unit side bracket (insulator) and the vehicle body side bracket are adjusted, no that the variations (production variations and the like) in the plurality of directions of the vehicle can be adjusted (absorbed).

Effects of Invention

As described above, the vehicle including the engine mount units according to the present invention can absorb variations in a plurality of directions of the vehicle.

MODES FOR CARRYING OUT INVENTION

Hereinafter, description will be given on one embodiment of the present invention with reference to the drawings.

Figure 1:
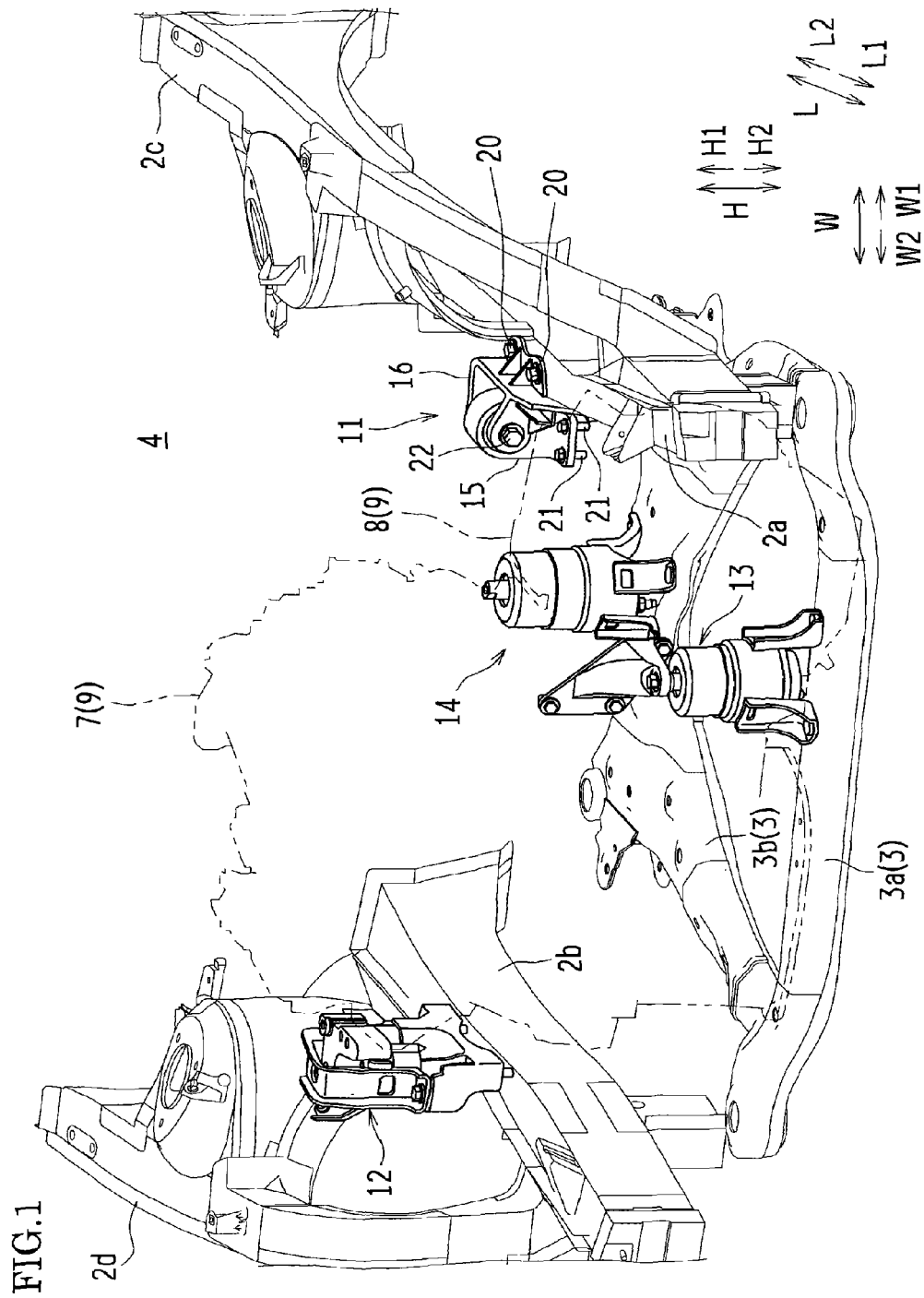
FIG. 1 is a perspective view showing a vicinity of an engine compartment formed on the front side of a vehicle (automobile) according to an embodiment of the present invention.
Figure 2:
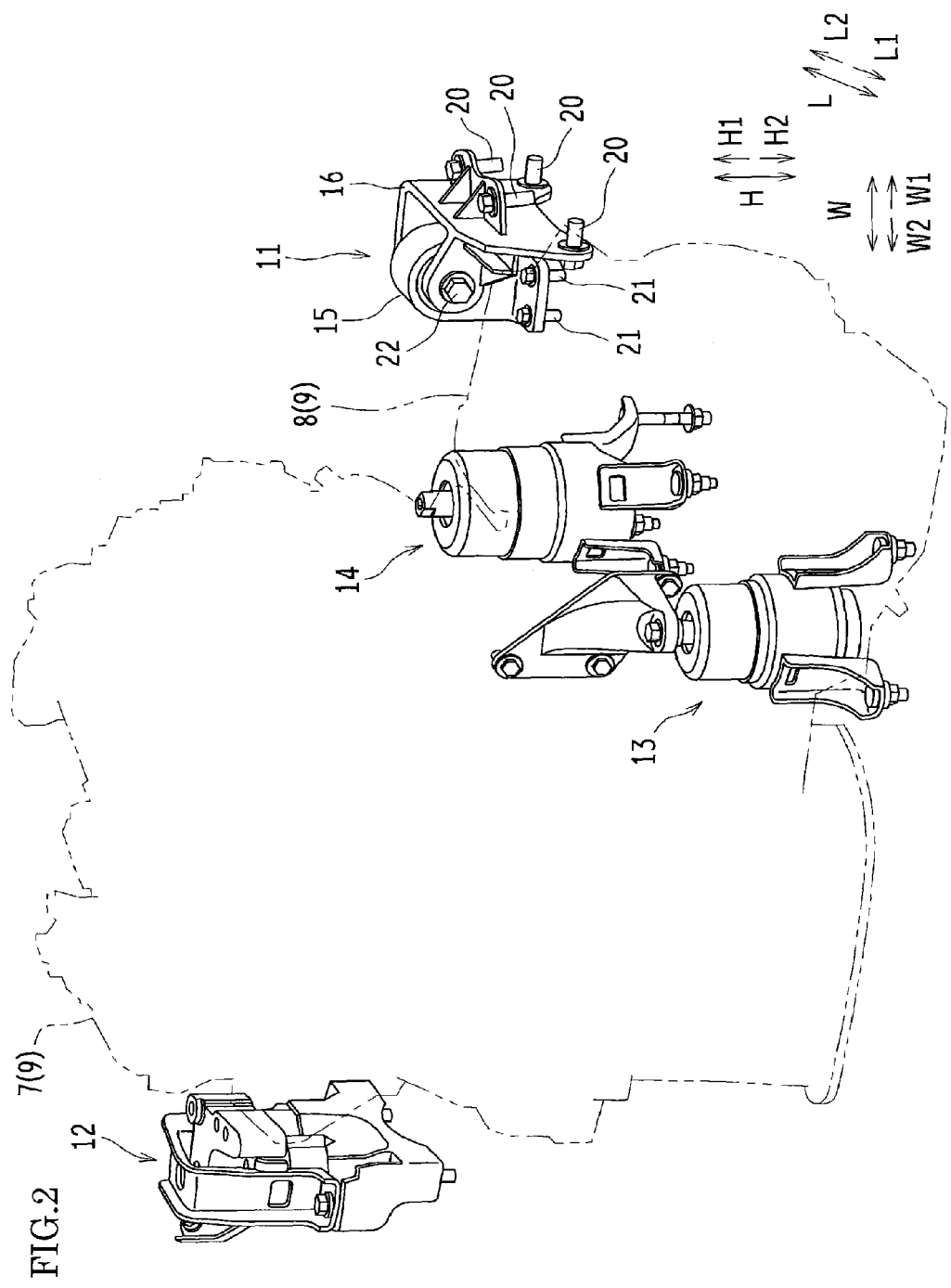
FIG. 2 is a perspective view showing a positional relationship between a power unit and engine mount units.

As shown in FIGS. 1 and 2, a vehicle 1 according to this embodiment includes: side members 2a and 2b disposed so as to extend in the longitudinal direction (L direction) of the vehicle; upper members 2c and 2d disposed above the side members 2a and 2b (in the direction indicated by the arrow H1); and a sub-frame 3 disposed between the side members 2a and 2b. An engine compartment 4 is formed by the side members 2a and 2b, the upper members 2c and 2d, the sub-frame 3 and the like. Note that, in the description below, the side members 2a and 2b, the upper members 2c and 2d and the sub-frame 3 are occasionally indicated by the term "vehicle body" for convenience sake.

A power unit 9, which includes an engine 7 and a transmission 8, is disposed in the engine compartment 4. The power unit 9 is mounted on the vehicle body (in the engine compartment 4) via a first engine mount unit 11, a second engine mount unit 12, a third engine mount unit 13 and a fourth engine mount unit 14.

The first engine mount unit 11 is disposed on the left side in the width direction (W direction) of the vehicle (i.e., in the direction indicated by the arrow W1) in the engine compartment 4, and on the upper side in the gravitational direction of the power unit 9. The second engine mount unit 12 is disposed on the right side in the width direction (W direction) of the vehicle (i.e., in the direction indicated by the arrow W2) in the engine compartment 4, and on the upper side in the gravitational direction of the power unit 9. The third engine mount unit 13 is disposed on the front side in the longitudinal direction (L direction) of the vehicle (i.e., in the direction indicated by the arrow L1) in the engine compartment 4, and on the lower side in the gravitational direction of the power unit 9. The fourth engine mount unit 14 is disposed on the rear side in the longitudinal direction (L direction) of the vehicle (i.e., in the direction indicated by the arrow L2) in the engine compartment 4, and on the lower side in the gravitational direction of the power unit 9.

The power unit 9 is supported by: the side member 2a via the first engine mount unit 11; the side member 2b via the second engine mount unit 12; a front side part 3a (in the direction indicated by the arrow L1) of the sub-frame 3 via the third engine mount unit 13; and a rear side part 3b (in the direction indicated by the arrow L2) of the sub-frame 3 via the fourth engine mount unit 14.

Here, when the power unit 9 is supported by the four engine mount units 11 to 14 (supported at four points), the power unit 9 is supported in a non-stationary manner. Thus, one point (the first engine mount unit 11) out of the four points does not share the load of the power unit 9, while the other three points (the second engine mount unit 12, the third engine mount unit 13 and the fourth engine mount unit 14) share the load of the power unit 9. In other words, the load of the power unit 9 is not distributed to the one point (the side member 2a) out of the four points, while it is distributed to the other three points (the side member 2b, and the front side part 3a and the rear side part 3b of the sub-frame 3).

The load of the power unit 9 is mainly supported by the third engine mount unit 13 and the fourth engine mount unit 14, and secondarily supported by the second engine mount unit 12. Here, the expression "mainly supported" means that a lame part of the load of the power unit 9 is supported, and "secondarily supported" means that relatively small part of the load is supported compared to the case of being "mainly supported".

Next, description in detail will be given on the configuration of the first engine mount unit 11 with reference to FIGS. 3 to 6.

Figure 3:
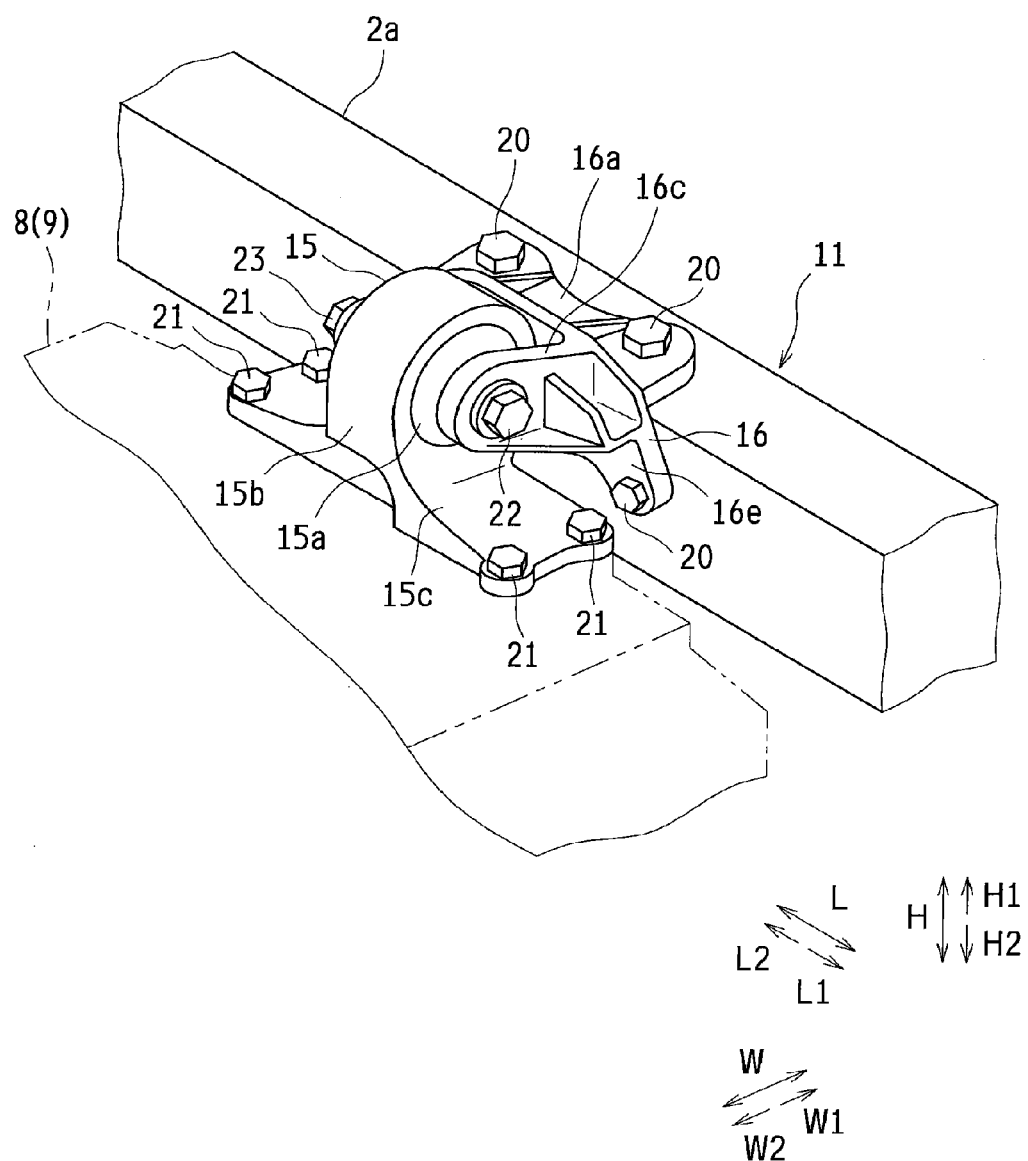
FIG. 3 is a perspective view showing a vicinity of an engine mount unit (first engine mount unit) to which no load of the power unit is distributed.
Figure 4:
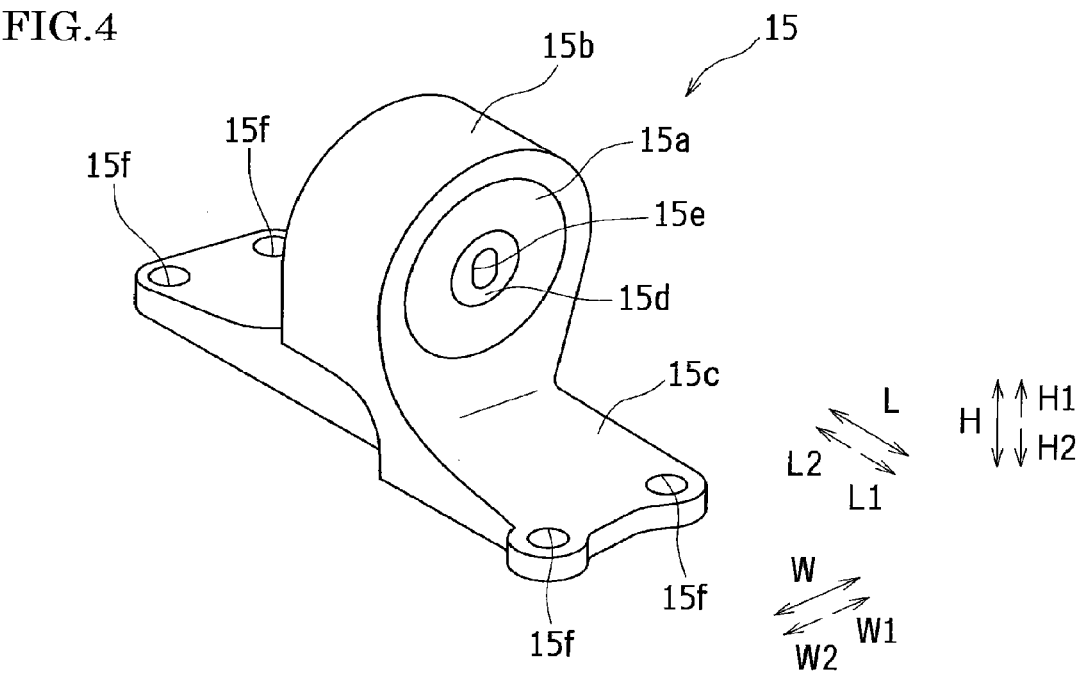
FIG. 4 is a perspective view showing a power unit side bracket and a mount rubber.
Figure 5:
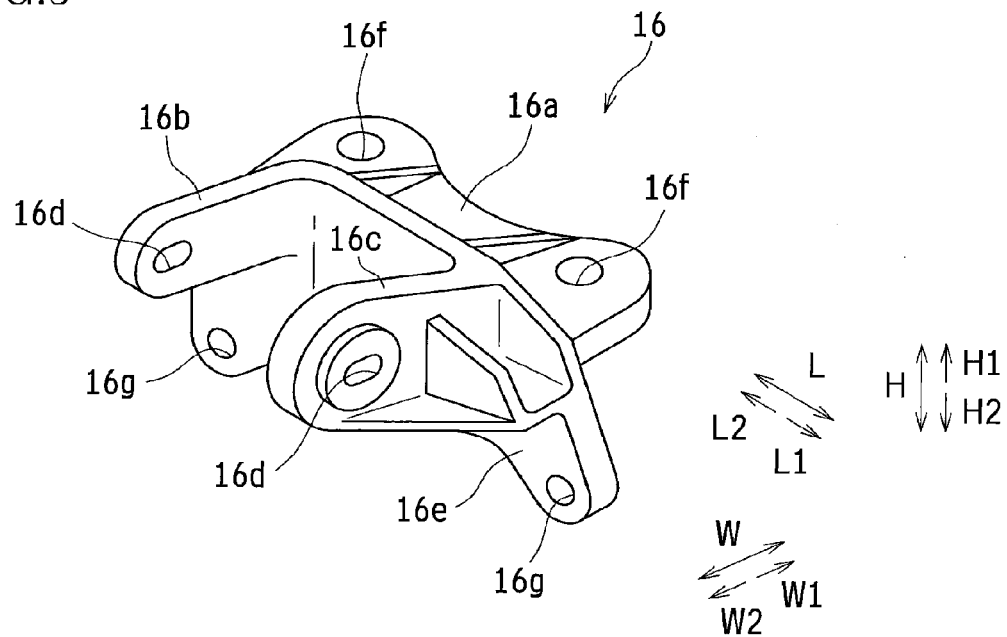
FIG. 5 is a perspective view showing a vehicle body side bracket.

As shown in FIGS. 3 to 5, the first engine mount unit 11 includes a power unit side bracket and a vehicle body side bracket 16. As shown in FIG. 3, the power unit side bracket 15 is fixed to the upper part of the power unit 9 (transmission 8) by four bolts 21. The vehicle body side bracket 16 is fixed to the upper part and the side part of the side member 2a by four bolts 20.

As shown in FIG. 4, the power unit side bracket 15 includes: a cylinder-shaped outer cylinder part 15b into which a mount rubber 15a is pressed; and a base part 15c disposed below the outer cylinder part 15b. The mount rubber 15a is made of a columnar-shaped rubber (elastic member) and the like so as to prevent vibration of the engine 7 from being transmitted to the side member 2a (vehicle body). The outer cylinder part 15b serves to hold the circumference of the mount rubber 15a. The base part 15c has a substantially rectangular shape when viewed from the height direction (H direction). Also, the base part 15c, which supports the outer cylinder part 15b, is fixed to the power unit 9 (transmission 8) via the bolts 21.

The mount rubber 15a, which is pressed into the outer cylinder part 15b of the power unit side bracket 15, has an inner peripheral surface that is vulcanization-adhered to an outer peripheral surface of a cylinder-shaped inner cylinder part 15d that is made of a metal and the like. The mount rubber 15a and the inner cylinder part 15d is an example of the "insulator" of the present invention. In the central part of the inner cylinder part 15d, a bolt hole 15e is pieced, through which the bolt 22 (see FIG. 3) is inserted so as to be screwed with a nut 23 (see FIG. 3). The bolt hole 15e is an example of the "second variation adjustment mechanism and the second long hole" of the present invention, while the bolt 22 and the nut 23 is each an example of the "fastening member" of the present invention. Also, in this embodiment, the bolt hole 15e is exemplarily formed in the central part of the inner cylinder part 15d. However, the bolt hole 15e may be directly formed in the central part of the mount rubber 15a.

Figure 6:
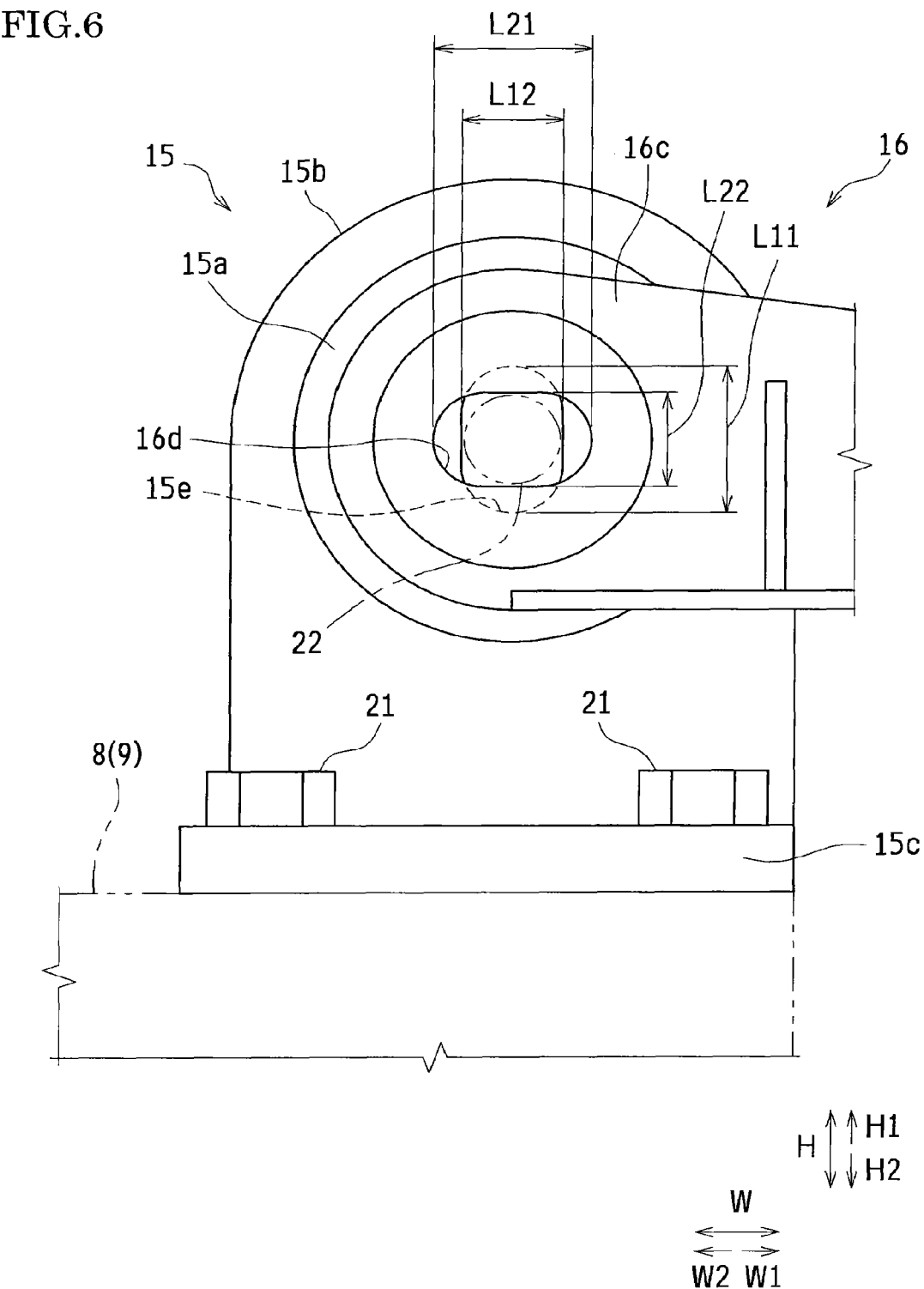
FIG. 6 is a diagram showing a vicinity of attachment portions (long holes) of the power unit side bracket and the vehicle body side bracket.

As shown in FIG. 6, the bolt hole 15e is formed in an elongated shape (as a long hole) so as to be elongated in the height direction (14 direction) of the vehicle. More specifically, the bolt hole 15e is formed so as to have a length L11 (long side) in the height direction (H direction) of the vehicle, the length L11 being longer than a length L12 (short side) in the width direction (W direction) of the vehicle.

When the power unit 9 is mounted on the vehicle body (when assembled), the positions of the power unit 9 and the side member 2a in the height direction (H direction) of the vehicle can be adjusted by the elongated-shaped bolt hole 15e within the range of the length L1 this way, variations in the positions of the power unit 9 and the side member 2a in the height direction (H direction) of the vehicle can be adjusted (absorbed).

As shown in FIG. 4, four bolt holes 15f are pierced in the base part 15c of the power unit side bracket 15 so that the bolts 21 (see FIG. 3) are respectively inserted through the bolt holes 15f Two bolt holes 15f are formed in the base part 15c in the direction indicated by the arrow L1 (in the front direction of the vehicle 1). Two bolt holes 15f are formed in the base part 15c in the direction indicated by the arrow L2 (in the rear direction of the vehicle 1).

As shown in FIG. 5, the vehicle body side bracket 16 includes an upper base part 16a that is fixed to the side member 2a by the bolts 20 (see FIG. 3). Sandwiching parts 16b and 16c are formed on the side opposite to the upper base part 16a relative to the side member 2a. The sandwiching parts 16b and 16c are formed in a substantially U shape when viewed from the above (H direction) so as to sandwich a circular surface of the mount rubber 15a pressed into the power unit side bracket 15.

The sandwiching parts 16b and 16c have respectively bolt holes 16d. The bolt holes 16d are coaxially disposed along the longitudinal direction (L direction) of the vehicle. Furthermore, the bolt holes 16d of the sandwiching parts 16b and 16c are formed respectively at positions corresponding to the bolt hole 15e of the inner cylinder part 15d that is adhered to the mount rubber 15a pressed into the power unit side bracket 15. The bolt holes 16d are an example of the "first variation adjustment mechanism and the first long hole" of the present invention.

As shown in FIG. 6, the respective bolt holes 16d are each formed in an elongated shape (as a long hole so as to be elongated in the width direction (W direction) of the vehicle. More specifically, the bolt holes 16d are each formed so as to have a length L21 (long side) in the width direction (W direction) of the vehicle, the length L21 being longer than a length L22 (short side) in the height direction (H direction) of the vehicle.

When the power unit 9 is mounted on the vehicle body (when assembled), the positions of the power unit 9 and the side member 2a in the width direction (W direction) of the vehicle can be adjusted by the elongated-shaped bolt holes 16d within the range of the length L21. In this way, variations in the positions of the power unit 9 and the side member 2a in the width direction (W direction) of the vehicle can be adjusted (absorbed).

As shown in FIG. 5, two bolt holes 16f are formed in the upper base part 16a of the vehicle body side bracket 16 so that the bolts 20 (see FIG. 3) are inserted through the respective bolt holes 16f in the height direction (H direction) of the vehicle. A lower base part 16e, which is fixed to the side portion of the side member 2a by the bolts 20, is formed under the upper base part 16a and the sandwiching parts 16b and 16c (in the direction indicated by the arrow H2). The lower base part 16e includes two bolt holes 16g through which the bolts 20 are respectively inserted in the width direction (W direction) of the vehicle.

Also, the shape of the bolt hole 15e of the inner cylinder part 15d that is adhered to the mount rubber 15a pressed into the power unit side bracket 15 is substantially the same as the shape of each bolt hole 16d of the vehicle body side bracket 16. As shown in FIG. 6, the long side of the bolt hole 15c of the power unit side bracket 15 is substantially orthogonal to the long side of each bolt hole 16d of the vehicle body side bracket 16. The long side L11 of the bolt hole 15e of the power unit side bracket 15 has substantially the same length as the long side L21 of each bolt hole 16d of the vehicle body side bracket 16. Likewise, the short side L12 of the bolt hole 15e of the power unit side bracket 15 has substantially the same length as the short side L22 of each bolt hole 16d of the vehicle body side bracket 16.

As shown in FIG. 3, the power unit side bracket 15 and the vehicle body side bracket 16 are fastened and fixed to each other by the nut 23 and bolt 22 that is inserted through the bolt hole 15e and the respective bolt holes 16d.

Next, an example of a process for mounting the power unit 9 on the vehicle body via the first engine mount unit 11 to the fourth engine mount unit 14 will be described with reference to FIGS. 1, 4 and 5.

As described above, in this embodiment, the load of the power unit 9 is supported (distributed) on the sub-frame 3 via the third engine mount unit 13 and the fourth engine mount unit 14. Also, the load of the power unit 9 is supported (distributed) on the side member 2b via the second engine mount unit 12. The first engine mount unit 11, which is an engine mount unit that does not support the load of the power unit 9, has a function to adjust (absorb) both variations in the width direction (W direction) and the height direction (H direction) of the vehicle.

Generally, the vehicle body (frame) is formed by welding steel metal parts, which results in production variations being relatively large. The power unit 9 is mounted on the vehicle body via the first engine mount unit 11 to the fourth engine mount unit 14, however, production variations of the vehicle body and assembly variations of the engine mount units may prevent the power unit 9 from maintaining a predetermined position. For this reason, in this embodiment, the engine mount units include an appropriate variation absorption mechanism (mechanism for absorbing production variations).

As shown in FIG. 1, when the power unit 9 is mounted on the vehicle body (when assembled), the second engine mount unit 12 serves as a mounting basis. Thus, the power unit 9 is fixed to the vehicle body by the bolts and the like via, the second engine mount unit 12. Similarly, the power unit 9 is fixed to the vehicle body by the bolts and the like via the third engine mount unit 13 and the fourth engine mount unit 14.

Here, in this embodiment, the variations in the positions of the power unit 9 and the vehicle body at the fastening portions (mounting position) in the width direction (W direction) and the height direction (H direction) of the vehicle (i.e., relative displacement) are absorbed by the first engine mount unit 11. However, the third engine mount unit 13 and the fourth engine mount unit 14 also absorb the variations of the vehicle body (i.e., they perform alignment correction).

More specifically, the third engine mount unit 13 and the fourth engine mount unit 14 are attached respectively to the front side part 3a and the rear side part 3b of the sub-frame 3 via attachment holes. The attachment holes are each formed so as to have a larger size than the normal size. That is, the respective attachment holes in the front side part 3a and in the rear side part 3b of the sub-frame 3 are each formed to have a size within which a bolt, which is inserted into the corresponding attachment hole, can be moved in the longitudinal direction (L direction) and the width direction (W direction) of the vehicle. Thus, when the power unit 9 is mounted on the from side part 3a and the rear side part 3b of the sub-frame 3, the variations in the positions of the power unit 9 and the vehicle body in the longitudinal direction (L direction) and in the width direction (W direction) of the vehicle are absorbed (i.e., the alignment correction is performed).

Finally, the power unit 9 is fastened and fixed to the side member 2a via the first engine mount unit 11. That is, the bolt 22 is inserted through: the bolt hole 15e of the inner cylinder part 15d that is adhered to the mount rubber 15a pressed into the power unit side bracket 15; and the bolt holes 16d of the vehicle body side bracket 16, so that the bolt 22 is fastened and fixed by the nut 23.

At this time, when the power unit 9 is mounted on the vehicle body, the variations in the height direction (H direction) are absorbed by the bolt hole 15e (see FIG. 4) formed so as to be elongated in the height direction (H direction) of the power unit side bracket 15 of the first engine mount unit 11 that is disposed on the upper side in the gravitational direction of the power unit 9.

Also, when the power unit 9 is mounted on the vehicle body, the variations in the width direction (W direction) are absorbed by the bolt holes 16d (see FIG. 5) formed so as to be elongated in the width direction (W direction) of the vehicle body side bracket 16 of the first engine mount unit 11 that is disposed on the upper side in the gravitational direction of the power unit 9.

As described above, this embodiment can provide effects specified below.

As described above, in this embodiment, the load of the power unit 9 is not distributed to the first engine mount unit 11 out of the four engine mount units, while the load of the power unit 9 is distributed to the second engine mount unit 12 to the fourth engine mount unit 14 out of the four engine mount units. The first engine mount unit 11, to which the load of the power unit 9 is not distributed, includes: the power unit side bracket 15 that is attached to the power unit 9; the vehicle body side bracket 16 that is attached to the vehicle body; and the insulator (the mount rubber 15a and the inner cylinder part 15d) disposed in the power unit side bracket 15. At the attachment portions of the power unit side bracket 15 and the vehicle body side bracket 16 of the first engine mount unit 11 to which the load of the power unit 9 is not distributed, the bolt hole 15e (long hole) is provided in the inner cylinder part 15d that is adhered to the mount rubber 15a pressed into the power unit side bracket 15 so as to adjust the variations in the height direction (H direction) of the vehicle, and the bolt holes 16d (long holes) are provided in the vehicle body side bracket 16 so as to adjust the variations in the width direction (W direction) intersecting with the height direction (H direction) of the vehicle.

In this way, when the power unit 9 is mounted on the vehicle body via the second engine mount unit 12 to the fourth engine mount unit 14 to which the load is distributed, and further when the power unit 9 is mounted on the vehicle body via the first engine mount unit 11 to which the load is not distributed, the variations in the mounting position of the power unit 9 on the vehicle body can be adjusted in the width direction (W direction) and the height direction (H direction) of the vehicle by: the bolt hole 15e of the inner cylinder part 15d that is adhered to the mount rubber 15a pressed into the power unit side bracket 15; and the bolt holes 16d of the vehicle body side bracket 16. That is, in the first engine mount unit 11 to which the load of the power unit 9 is not distributed, the relative positions of the power unit side bracket 15 and the vehicle body side bracket 16 are adjusted in the plurality of directions (the width direction (W direction) and the height direction (H direction)) of the vehicle 1, thus the variations in the plurality of directions of the vehicle 1 can be adjusted (absorbed).

Also, when the load of the power unit 9 is mainly distributed to (supported by) the third engine mount unit 13 and the fourth engine mount unit 14 disposed on the lower side in the gravitational direction of the vehicle body, there is a problem that, when the power unit 9 is mounted on the vehicle body, it is not possible to perform position adjustment in the H direction (the height direction) by the third engine mount unit 13 and the fourth engine mount unit 14 respectively taking a large load. On the other hand, in this embodiment, the first engine mount unit 11 is disposed on the upper side in the gravitational direction of the vehicle body. Thus, by performing position adjustment not only in the W direction (the width direction) but also in the H direction (the height direction) by the first engine mount unit 11, it is possible to perform position adjustment of the power unit 9 and the vehicle body with high accuracy. Note that when the second engine mount unit 12 is configured similar to the first engine mount unit 11, it is also possible to perform position adjustment in the W direction (the width direction) and in the H direction (the height direction) by the second engine mount unit 12.

Also, as described above, in this embodiment, the bolt hole 15e of the inner cylinder part 15d that is adhered to the mount rubber 15a pressed into the power unit side bracket 15 is formed as a long hole that is elongated in the height direction (H direction) of the vehicle, while the bolt holes 16d provided in the vehicle body side bracket 16 are each formed as a long hole that is elongated in the width direction (W direction) of the vehicle. In this way, the relative positions of the power unit side bracket 15 and the vehicle body side bracket 16 can be adjusted in the long side direction (the height direction; H direction) of the bolt hole (long hole) 15d and in the long side direction (the width direction; W direction) of the bolt holes (long holes) 16d. Thus, the bolt holes 15e and 16d (long holes) can absorb the variations in the mounting position of the power unit 9 on the vehicle body.

Also, as described above, in this embodiment, it is possible to adjust the relative positions of the power unit side bracket 15 and the vehicle body side bracket 16 in the state in which the bolt 22 is being inserted through the bolt holes 16d of the vehicle body side bracket 16 and the bolt hole 15e in the inner cylinder part 15d that is adhered to the mount rubber 15a pressed into the power unit side bracket 15. In this way, the relative positions of the power unit side bracket 15 and the vehicle body side bracket 16 can be adjusted in the long side direction (the height direction (H direction) and the width direction (W direction)) of the bolt holes 15e and 16d relative to the bolt 22. As a result, it is possible to absorb the variation in the mounting position of the power unit 9 on the vehicle body by the bolt holes 15e and 16d using the bolt 22.

Other Embodiments

Note that the embodiment disclosed above is to be considered in all respects as illustrative and not limiting. The scope of the present invention is indicated by the appended claims rather than by the foregoing description, and all modifications and changes that come within the meaning and range of equivalency of the claims are intended to be embraced therein.

For example, in the above embodiment, the first direction is the height direction of the vehicle while the second direction is the width direction of the vehicle. However, the present invention is not limited thereto. In the present invention, the first (second) direction may be the height direction of the vehicle while the second (first) direction may be the longitudinal direction of the vehicle. Also, the first (second) direction may be the width direction of the vehicle while the second (first) direction may be the longitudinal direction of the vehicle.

Also, in the above embodiment, as an example of the first and second variation adjustment mechanisms, the elongated-shaped bolt holes are formed. However, the present invention is not limited thereto. For example, the bolt holes may have a shape other than the elongated shape, provided that they can adjust (absorb) the variations in the mounting position of the power unit on the vehicle body. In the present invention, the first and second variation adjustment mechanisms may be formed in a polygonal shape such as a rectangular shape.

Also, in the above embodiment, the power unit side bracket is attached to the upper part of the power unit while the vehicle body side bracket is attached to the side member. However, the present invention is not limited thereto. For example, the power unit side bracket may be attached to the side member while the vehicle body side bracket may be attached to the upper part of the power unit.

Also, in the above embodiment, the bolt hole elongated in the height direction (H direction) is formed in the inner cylinder part pressed into the mount rubber provided in the power unit side bracket, while the bolt holes elongated in the width direction (W direction) are formed in the vehicle body side bracket. However, the present invention is not limited thereto. For example, the bolt hole elongated in the width direction (W direction) may be formed in the inner cylinder part pressed into the mount rubber provided in the power unit side bracket, while the bolt holes elongated in the height direction (H direction) may be formed in the vehicle body side bracket.

Also, in the above embodiment, the shape of the bolt hole in the inner cylinder part pressed into the mount rubber provided in the power unit side bracket is substantially the same as the shape of the bolt holes in the vehicle body side bracket. However, the present invention is not limited thereto. For example, the respective bolt holes may have different shapes, provided that they can adjust (absorb) the variations in the position of the power unit and the vehicle body in the width direction and the height direction.

This application claims priority on Patent Application No. 2013-220868 filed in Japan on Oct. 24, 2013, the entire contents of which are herein incorporated by reference.

INDUSTRIAL APPLICABILITY

The present invention can be applied to a vehicle including engine mount units, more specifically, it can be applied to a vehicle including a plurality of engine mount units via which a power unit is mounted on a vehicle body.

DESCRIPTION OF REFERENCE NUMERALS

1 Vehicle
7 Engine
8 Transmission
9 Power unit
11 First engine mount unit
12 Second engine mount unit
13 Third engine mount unit
14 Fourth engine mount unit
15 Power unit side bracket
15a Mount rubber (insulator)
15d Inner cylinder part (insulator)
15e Bolt hole (second variation adjustment mechanism, second long hole)
16 Vehicle body side bracket
16d Bolt hole (first variation adjustment mechanism, first long hole)
22 Bolt (fastening member)
23 Nut (fastening member)

The invention claimed is:

1. A vehicle comprising first, second, third and fourth engine mount units via which a power unit is mounted on a vehicle body,
wherein a load of the power unit is not distributed to the first engine mount unit while the load of the power unit is distributed to the second, third and fourth engine mount units,
wherein the first engine mount unit includes: a power unit side bracket to be attached to the power unit; a vehicle body side bracket to be attached to the vehicle body; and an insulator disposed between the power unit side bracket and the vehicle body side bracket,
wherein, at attachment portions of the power unit side bracket and the vehicle body side bracket of the first engine mount unit, a first variation adjustment mechanism to adjust variations in a first direction is provided in the vehicle body side bracket while a second variation adjustment mechanism to adjust variations in a second direction intersecting with the first direction is provided in the insulator,
wherein the first direction is a width direction of the vehicle, and the second direction is a height direction of the vehicle,
wherein the first variation adjustment mechanism provided in the vehicle body side bracket is configured to adjust variations in the width direction of the vehicle,
wherein the second variation adjustment mechanism provided in the insulator is configured to adjust variations in the height direction of the vehicle, and
wherein the first and the second engine mount units are disposed on an upper side, in a gravitational direction, of the power unit while the third and the fourth engine mount units are disposed on a lower side, in the gravitational direction, of the power unit.

2. The vehicle comprising the engine mount units according to claim 1,
wherein the first variation adjustment mechanism provided in the vehicle body side bracket is a first long hole elongated in the first direction, and
wherein the second variation adjustment mechanism provided in the insulator is a second long hole elongated in the second direction intersecting with the first direction.

3. The vehicle comprising the engine mount units according to claim 1, further comprising a fastening member to fix the power unit side bracket, the vehicle body side bracket and the insulator,
wherein relative positions of the power unit side bracket and the vehicle body side bracket are adjustable in a state in which the fastening member is being inserted through: the first variation adjustment mechanism provided in the vehicle body side bracket; and the second variation adjustment mechanism provided in the insulator.

4. The vehicle comprising the engine mount units according to claim 1,
wherein the insulator including the second variation adjustment mechanism is provided in the power unit side bracket.

5. A vehicle comprising first, second, third and fourth engine mount units via which a power unit is mounted on a vehicle body,
wherein a load of the power unit is not distributed to the first engine mount unit while the load of the power unit is distributed to the second, third and fourth engine mount units,
wherein the first engine mount unit includes: a power unit side bracket to be attached to the power unit; a vehicle body side bracket to be attached to the vehicle body; and an insulator disposed between the power unit side bracket and the vehicle body side bracket,
wherein, at attachment portions of the power unit side bracket and the vehicle body side bracket of the first engine mount unit, a first variation adjustment mechanism to adjust variations in a first direction is provided in the power unit side bracket while a second variation adjustment mechanism to adjust variations in a second direction intersecting with the first direction is provided in the insulator that is provided in the vehicle body side bracket, wherein the first direction is a width direction of the vehicle, and the second direction is a height direction of the vehicle, wherein the first variation adjustment mechanism provided in the power unit side bracket is configured to adjust variations in the width direction of the vehicle, wherein the second variation adjustment mechanism provided in the insulator is configured to adjust variations in the height direction of the vehicle, and wherein the first and the second engine mount units are disposed on an upper side, in a gravitational direction, of the power unit while the third and the fourth engine mount units are disposed on a lower side, in the gravitational direction, of the power unit.

6. The vehicle comprising the engine mount units according to claim 5, wherein the first variation adjustment mechanism provided in the power unit side bracket is a first long hole elongated in the first direction, and wherein the second variation adjustment mechanism provided in the insulator is a second long hole elongated in the second direction intersecting with the first direction.

7. The vehicle comprising the engine mount units according to claim 5, further comprising a fastening member to fix the power unit side bracket, the vehicle body side bracket and the insulator, wherein relative positions of the power unit side bracket and the vehicle body side bracket are adjustable in a state in which the fastening member is being inserted through: the first variation adjustment mechanism provided in the power unit side bracket; and the second variation adjustment mechanism provided in the insulator.

\* \* \* \* \*